US012703773B2

(12) United States Patent
Kou et al.

(10) Patent No.: US 12,703,773 B2
(45) Date of Patent: Aug. 11, 2026

(54) POLYALKYLENEIMINE-BASED POLYMER AS DISPERSANTS

(71) Applicant: BASF SE, Ludwigshafen am Rhein (DE)

(72) Inventors: Huiguang Kou, Ludwigshafen am Rhein (DE); Steffen Onclin, Ludwigshafen am Rhein (DE); Andreas Gernandt, Ludwigshafen am Rhein (DE); Johannes Hermann Willenbacher, Ludwigshafen am Rhein (DE); Clemens Auschra, Ludwigshafen am Rhein (DE)

(73) Assignee: BASF SE, Ludwigshafen am Rhein (DE)

( * ) Notice: Subject to any disclaimer, the term of this patent is extended or adjusted under 35 U.S.C. 154(b) by 720 days.

(21) Appl. No.: 17/761,374

(22) PCT Filed: Sep. 16, 2020

(86) PCT No.: PCT/EP2020/075838
§ 371 (c)(1),
(2) Date: Mar. 17, 2022

(87) PCT Pub. No.: WO2021/052999
PCT Pub. Date: Mar. 25, 2021

(65) Prior Publication Data

US 2022/0380554 A1 Dec. 1, 2022

(30) Foreign Application Priority Data

Sep. 20, 2019 (EP) .................................... 19198618

(51) Int. Cl.

| | |
|---|---|
| ***C08G 73/04*** | (2006.01) |
| ***C08G 73/02*** | (2006.01) |
| ***C08G 81/02*** | (2006.01) |
| ***C09D 5/02*** | (2006.01) |
| ***C09D 7/45*** | (2018.01) |
| ***C09D 7/65*** | (2018.01) |
| ***C09D 11/00*** | (2014.01) |
| ***C09K 23/16*** | (2022.01) |
| ***C09K 23/42*** | (2022.01) |

(52) U.S. Cl.
CPC ....... *C08G 81/028* (2013.01); *C08G 73/0206* (2013.01); *C08G 73/0213* (2013.01); *C09D 5/027* (2013.01); *C09D 7/45* (2018.01); *C09D 7/65* (2018.01); *C09D 11/00* (2013.01); *C09K 23/16* (2022.01); *C09K 23/42* (2022.01)

(58) Field of Classification Search
None
See application file for complete search history.

(56) References Cited

U.S. PATENT DOCUMENTS

| | | | | |
|---|---|---|---|---|
| 7,872,070 B2 * | 1/2011 | Thetford | C09K 23/16 524/608 |
| 8,202,935 B2 * | 6/2012 | Alzer | C09K 23/16 524/602 |
| 8,268,957 B2 | 9/2012 | Liu et al. | |
| 2006/0183815 A1 * | 8/2006 | Alzer | C09B 67/009 106/31.75 |
| 2010/0174046 A1 * | 7/2010 | Liu | C09K 23/16 528/332 |
| 2016/0222229 A1 | 8/2016 | Yamada et al. | |
| 2019/0092903 A1 | 3/2019 | Kou et al. | |
| 2020/0230561 A1 * | 7/2020 | Coulbeck | C08G 73/02 |
| 2022/0298422 A1 | 9/2022 | Coulbeck et al. | |

FOREIGN PATENT DOCUMENTS

| | | |
|---|---|---|
| EP | 1685895 A2 | 8/2006 |
| JP | 2006-206902 A | 8/2006 |
| JP | 2009-531490 A | 9/2009 |
| JP | 2015-071681 A | 4/2015 |
| JP | 2019-512037 A | 5/2019 |
| JP | 2020-534410 A | 11/2020 |
| WO | 92/13911 A1 | 8/1992 |
| WO | 2008/107326 A1 | 9/2008 |
| WO | 2017/140538 A1 | 8/2017 |

OTHER PUBLICATIONS

International Preliminary Report on Patentability received for PCT Patent Application No. PCT/EP2020/075838, mailed on Mar. 31, 2022, 8 pages.
International Search Report and Written Opinion received for PCT Patent Application No. PCT/EP2020/075838, mailed on Dec. 1, 2020, 8 pages.

* cited by examiner

*Primary Examiner* — David J Buttner
(74) *Attorney, Agent, or Firm* — Faegre Drinker Biddle & Reath LLP

(57) ABSTRACT

The presently claimed invention relates to polyalkyleneimine-based polymers that are useful as dispersants and a process for the preparation thereof. The presently claimed invention is also directed to dispersants that are useful in solvent-based dispersion systems as well as in water-based dispersion systems.

14 Claims, No Drawings

POLYALKYLENEIMINE-BASED POLYMER AS DISPERSANTS

CROSS-REFERENCE TO RELATED APPLICATIONS

This application is a national stage application (under 35 U.S.C. § 371) of PCT/EP2020/075838, filed Sep. 16, 2020, which claims benefit of European Application No. 19198618.1, filed Sep. 20, 2019, both of which are incorporated herein by reference in their entirety.

FIELD OF THE INVENTION

The presently claimed invention relates to polyalkyleneimine-based polymers that are useful as dispersants and a process for the preparation thereof. The presently claimed invention is also directed to dispersants that are useful in solvent-based dispersion systems as well as in water-based dispersion systems.

BACKGROUND OF THE INVENTION

Dispersions containing solid dispersible particles, such as organic or inorganic pigments, are used for a number of different technical applications, e.g. as coating materials, for printing inks, colouring plastic materials, including fibres, glasses, or ceramic products, for formulations in cosmetics, or for the preparation of paint systems, in particular the automotive, industrial and decorative paints.

The preparation of dispersions involves incorporation of the solid materials such as pigments into a liquid vehicle by replacing the pigment-air interfaces with pigment-vehicle interfaces, which is facilitated by the presence of a dispersant. Even though certain organic vehicles have good particle wetting properties, dispersants are used to ensure a uniform and stable dispersion. Dispersants also have a bearing on various process parameters involved in preparation of dispersion such as dispersion time and energy requirement. An ideal dispersion consists of a homogenous and stable suspension of solid materials after size reduction or milling of any aggregates and agglomerates.

A dispersant improves various dispersion properties such as millbase viscosity and rheology behavior. An enhanced rheology behaviour is characterized by suitable viscosities over a wide range of shear rates. An improvement in viscosity and rheology behaviour leads to improved application properties such as better flowability and levelling, less spattering and sagging of the coating.

The dispersant is also a determining factor of the aesthetics and physical properties of a coating. A dispersant can act as a flow control agent and bring about improved spreading of the composition over the surface of the substrate and improve the flow of the polymer film which forms in the course of curing, resulting in a smooth surface. As a consequence, the dispersant reduces the formation of defects, known as craters, which are caused by impurities acting from the outside or by impurities on the surface of the substrate.

Due to environmental concerns, the use of pigment dispersions based on aqueous vehicles as well as the dispersions based on organic solvents with high solids content are particularly preferred. Depending on the type and the polarity of the liquid phase, e.g. water, organic solvents or mixtures thereof, an appropriate polymeric dispersant is selected.

In view of the wide application of dispersions containing fine particulate solid materials and the important role played by the dispersants in their preparation, stability and properties, there is a growing need for improved dispersants that can assist the preparation of dispersions having the desired characteristics.

WO 1992/13911 A1 relates to an acetoacetanilide functionalized poly(alkylene glycol), which is prepared by reacting a poly(alkylene glycol) monoamine, diamine or triamine with isatoic anhydride followed by acetoacetylation of the resultant aminobenzamide. WO 1992/13911 A1 suggests using said acetoacetanilide functionalized poly(alkylene glycols for preparing the improved diarylide pigment compositions, which in turn are useful for preparing the storage stable printing inks, especially of the publication gravure type inks.

WO 2008/107326 A1 relates to poly(alkylene imine) grafted polymers of the acrylate, polyether or polyester type, which are useful as pigment dispersants.

Accordingly, it is an object of the presently claimed invention to provide dispersants having improved pigment affinity and rheology behaviour, as expressed by the viscosity of the millbase at a given shear rate and improved gloss of the surface coatings. Further, it is desired that the dispersant can be used in solvent-based systems and in water-based systems.

SUMMARY OF THE INVENTION

Surprisingly, it was found that the polymers of the presently claimed invention having (a) a polyalkyleneimine backbone; (b) at least one aromatic moiety P.1, which is bound to a nitrogen atom of the polyalkyleneimine backbone via a carboxamide or carboximide group; (c) at least one polyester moiety P.2, which is bound to a nitrogen atom of the polyalkyleneimine backbone via a carboxamide; and (d) at least one aliphatic polyether moiety P.3, which is bound to a nitrogen atom of the polyalkyleneimine backbone via a direct bond or via a linker, are useful as dispersants. The polymers of the presently claimed invention have a high pigment affinity and they can be used as dispersants in solvent-based systems as well as in water-based systems.

Accordingly, the main aspect of the presently claimed invention is directed to a polymer having a) a polyalkyleneimine backbone;

b) at least one aromatic moiety P.1, which is bound to a nitrogen atom of the polyalkyleneimine backbone via a carboxamide or carboximide group;

c) at least one polyester moiety P.2, which is bound to a nitrogen atom of the polyalkyleneimine backbone via a carboxamide; and d) at least one aliphatic polyether moiety P.3, which is bound to a nitrogen atom of the polyalkyleneimine backbone via a direct bond or via a linker.

In another aspect, the presently claimed invention provides a process for preparing the polymer; the process comprises the following steps.

i. A polyalkyleneimine is reacted with an aromatic carboxylic acid, an aromatic carboxylic anhydride or with an amide or imide forming derivative of an aromatic carboxylic acid, in such an amount that theoretically at most 90%, based on the total amount of primary and secondary nitrogen atoms of the polyalkyleneimine can be consumed.

ii. The product of step (i) is reacted with a lactone monomer or a polyester moiety having a terminal carboxyl group obtainable from the lactone monomer.

iii. The product of step (ii) is reacted with an alkylene oxide or a polyether moiety having a terminal radical selected from an acrylate, an isocyanato, and a carboxylate.

In yet another aspect, the presently claimed invention provides a liquid composition in the form of a dispersion comprising a particulate solid material selected from the group consisting of pigments and fillers, and a liquid diluent. The particulate solid material is dispersed in the liquid diluent which further comprises the polymer.

DETAILED DESCRIPTION

Before the present compositions and formulations of the presently claimed invention are described, it is to be understood that this invention is not limited to particular compositions and formulations described, since such compositions and formulation may, of course, vary. It is also to be understood that the terminology used herein is not intended to be limiting, since the scope of the presently claimed invention will be limited only by the appended claims.

If hereinafter a group is defined to comprise at least a certain number of embodiments, this is meant to also encompass a group which preferably consists of these embodiments only. Furthermore, the terms 'first', 'second', 'third' or 'a', 'b', 'c', etc. and the like in the description and in the claims, are used for distinguishing between similar elements and not necessarily for describing a sequential or chronological order. It is to be understood that the terms so used are interchangeable under appropriate circumstances and that the embodiments of the presently claimed invention described herein are capable of operation in other sequences than described or illustrated herein. In case the terms 'first', 'second', 'third' or '(A)', '(B)' and '(C)' or '(a)', '(d)', 'i', 'ii' etc. relate to steps of a method or use or assay there is no time or time interval coherence between the steps, that is, the steps may be carried out simultaneously or there may be time intervals of seconds, minutes, hours, days, weeks, months or even years between such steps, unless otherwise indicated in the application as set forth herein above or below.

Furthermore, the ranges defined throughout the specification include the end values as well, i.e. a range of 1 to 10 implies that both 1 and 10 are included in the range. For the avoidance of doubt, applicant shall be entitled to any equivalents according to applicable law.

In the following passages, different aspects of the presently claimed invention are defined in more detail. Each aspect so defined may be combined with any other aspect or aspects unless clearly indicated to the contrary. In particular, any feature indicated as being preferred or advantageous may be combined with any other feature or features indicated as being preferred or advantageous.

Reference throughout this specification to 'one embodiment' or 'an embodiment' means that a particular feature, structure or characteristic described in connection with the embodiment is included in at least one embodiment of the presently claimed invention. Thus, appearances of the phrases 'in one embodiment' or 'in an embodiment' in various places throughout this specification are not necessarily all referring to the same embodiment, but may refer to the same embodiment. Further, as used in the following, the terms "preferably", "more preferably", "even more preferably", "most preferably" and "in particular" or similar terms are used in conjunction with optional features, without restricting alternative possibilities. Thus, features introduced by these terms are optional features and are not intended to restrict the scope of the claims in any way.

Furthermore, the particular features, structures or characteristics may be combined in any suitable manner, as would be apparent to a person skilled in the art from this disclosure, in one or more embodiments. Furthermore, while some embodiments described herein include some, but not other features included in other embodiments, combinations of features of different embodiments are meant to be within the scope of the presently claimed invention, and form different embodiments, as would be understood by those in the art. For example, in the appended claims, any of the claimed embodiments can be used in any combination.

Further, it shall be noted that the terms "at least one", "one or more" or similar expressions indicating that a feature or element may be present once or more than once typically will be used only once when introducing the respective feature or element. In the following, in most cases, when referring to the respective feature or element, the expressions "at least one" or "one or more" will not be repeated, non-withstanding the fact that the respective feature or element may be present once or more than once.

Surprisingly, it was found that the polymers of the presently claimed invention are useful as dispersants in solvent-based systems as well as in water-based systems. The dispersants have a high pigment affinity. Accordingly, dispersions containing fine particulate solid materials such as paint compositions comprising the dispersants of the presently claimed invention have a high stability and improved application characteristics such as a low viscosity. As a result, they provide a surface coating with a low crater ranking.

Accordingly, the main aspect of the presently claimed invention is directed to a polymer having a) a polyalkyleneimine backbone;
b) at least one aromatic moiety P.1, which is bound to a nitrogen atom of the polyalkyleneimine backbone via a carboxamide or carboximide group;
c) at least one polyester moiety P.2, which is bound to a nitrogen atom of the polyalkyleneimine backbone via a carboxamide; and
d) at least one aliphatic polyether moiety P.3, which is bound to a nitrogen atom of the polyalkyleneimine backbone via a direct bond or via a linker.

In a preferred embodiment of the presently claimed invention, the polymer comprises a) a polyalkyleneimine backbone;
b) at least one aromatic moiety P.1, which is bound to a nitrogen atom of the polyalkyleneimine backbone via a carboxamide or carboximide group;
c) at least one polyester moiety P.2, which is bound to a nitrogen atom of the polyalkyleneimine backbone via a carboxamide; and
d) at least one aliphatic polyether moiety P.3, which is bound to a nitrogen atom of the polyalkyleneimine backbone via a direct bond.

In another preferred embodiment of the presently claimed invention, the polymer comprises a) a polyalkyleneimine backbone;
b) at least one aromatic moiety P.1, which is bound to a nitrogen atom of the polyalkyleneimine backbone via a carboxamide or carboximide group;
c) at least one polyester moiety P.2, which is bound to a nitrogen atom of the polyalkyleneimine backbone via a carboxamide; and d) at least one aliphatic polyether moiety P.3, which is bound to a nitrogen atom of the polyalkyleneimine backbone via a linker.

Within the context of the presently claimed invention, the term "alkyl", as used herein, refers to an acylic saturated aliphatic group, including linear or branched alkyl saturated hydrocarbon radicals, denoted by a general formula $C_nH_{2n+1}$ and wherein n is the number of carbon atoms such as 1, 2, 3, 4, etc.

The term "aryl", as used herein, refers to mono- or polycyclic, optionally substituted aromatic radicals having 6 to 20 ring carbon atoms. The term "heteroaryl" refers to "aryl" groups as described above and containing 1, 2, 3, 4, 5 or 6 heteroatom(s) such as N or O. The term "alkylaryl" refers to alkyl-substituted analogs of the above "aryl" groups.

In a preferred embodiment of the presently claimed invention, the polyalkyleneimine backbone has a weight average molecular weight in the range of from 100 g/mol to 20,000 g/mol, as determined according to DIN 55672-1.

In a more preferred embodiment of the presently claimed invention, the polyalkyleneimine backbone has a weight average molecular weight in the range of from 400 g/mol to 10,000 g/mol, as determined according to DIN 55672-1.

In an even more preferred embodiment of the presently claimed invention, the polyalkyleneimine backbone has a weight average molecular weight in the range of from 500 g/mol to 5,000 g/mol, as determined according to DIN 55672-1.

In a most preferred embodiment of the presently claimed invention, the polyalkyleneimine backbone has a weight average molecular weight in the range of from 500 g/mol to 2,500 g/mol, as determined according to DIN 55672-1.

In a preferred embodiment of the presently claimed invention, the polyalkyleneimine backbone is a polyethyleneimine backbone.

In a particularly preferred embodiment of the presently claimed invention, the polyethyleneimine backbone has a weight average molecular weight of 800 g/mol, as determined according to DIN 55672-1.

In another particularly preferred embodiment of the presently claimed invention, the polyethyleneimine backbone has a weight average molecular weight of 2,000 g/mol, as determined according to DIN 55672-1.

In a preferred embodiment of the presently claimed invention, the at least one aromatic moiety P.1 is selected from the moieties of the formulae (P.1') and (P.1"), (P.1')

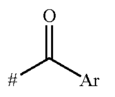

(P.1")

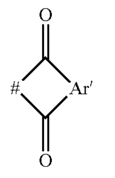

wherein

#indicates the point of attachment of the aromatic moiety P.1 to a nitrogen atom of the polyalkyleneimine backbone;

Ar is selected from the group consisting of phenyl and naphthyl, wherein phenyl and naphthyl, each independently, are unsubstituted or substituted by 1, 2, 3, 4 or 5 radicals, which are selected from the group consisting of halogen, OH, $C_1$-$C_4$-alkyl, $C_1$-$C_4$-alkoxy, C(═O)—OH, C(═O)—$NH_2$, $NH_2$, $NO_2$, NH—C(═O)—H, NH—$C_1$-$C_4$-alkyl and NH—C(═O)—$C_1$-$C_4$-alkyl; and Ar' is selected from the group consisting of 1,2-phenylene, 1,2-, 2,3-, or 1,8-naphthylene, wherein phenylene and naphthylene, each independently, are unsubstituted or substituted by 1, 2, 3, 4 or 5 radicals, which are selected from the group consisting of halogen, OH, $C_1$-$C_4$-alkyl, $C_1$-$C_4$-alkoxy, C(═O)—OH, C(═O)—$NH_2$, $NH_2$, $NO_2$, NH—C(═O)—H, NH—$C_1$-$C_4$-alkyl, and NH—C(═O)—$C_1$-$C_4$-alkyl.

In a preferred embodiment of the presently claimed invention, the at least one aromatic moiety P.1 is selected from the group consisting of moieties of formulae (P.1a), (P.1b), (P.1c), (P.1d), and (P.1e), (P.1a)

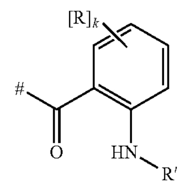

(P.1b)

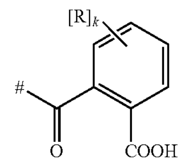

(P.1c)

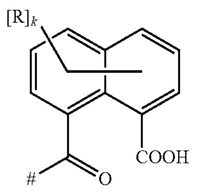

(P.1d)

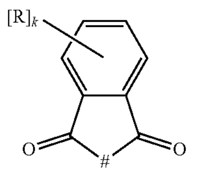

(P.1e)

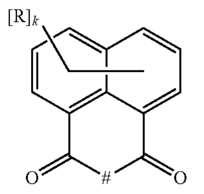

wherein

#indicates the point of attachment of the aromatic moiety to a nitrogen atom of the polyalkyleneimine backbone;

R is, identical or different, a radical selected from the group consisting of halogen, OH, $C_1$-$C_4$-alkyl, $C_1$-$C_4$-alkoxy, C(═O)—OH, C(═O)—$NH_2$, $NH_2$, $NO_2$, NH—C(═O)—H, NH—$C_1$-$C_4$-alkyl, and NH—C(═O)—$C_1$-$C_4$-alkyl;

k is 0, 1, 2, 3 or 4; and

R' is selected from the group consisting of hydrogen, $C_1$-$C_4$-alkyl, —C(═O)—H and —C(═O)$C_1$-$C_4$-alkyl.

In a more preferred embodiment of the presently claimed invention, the at least one aromatic moiety P.1 of formula (p.1a) comprises R' as H, and k=0.

In another more preferred embodiment of the presently claimed invention, the at least one aromatic moiety P.1 of formula (plc) comprises k=0.

In yet another more preferred embodiment of the presently claimed invention, the at least one aromatic moiety P.1 of formula (p.1e) comprises k=0.

In a preferred embodiment of the presently claimed invention, the polyester moiety P.2 is a radical of the formula (P.2a)

(P.2a)

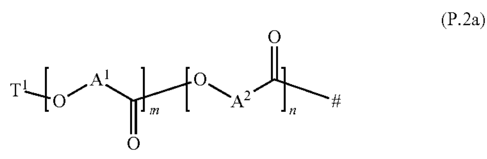

wherein,

#indicates the point of attachment to a nitrogen atom of the polyalkyleneimine backbone;

$T^1$ is hydrogen or $R^1$—C(═O)— wherein $R^1$ is $C_1$-$C_{24}$ alkyl;

$A^1$ and $A^2$ are each independently selected from $C_2$-$C_{12}$ alkylene;

m is an integer from 0 to 100;

n is an integer from 0 to 100; and m+n is an integer from 2 to 100.

In a preferred embodiment of the presently claimed invention, the "m" repeating units and the "n" repeating units form a gradient, a random or a block polymer structure.

In a more preferred embodiment of the presently claimed invention, $T^1$ is selected from the group consisting of hydrogen, $CH_3(CH_2)_3$—, $CH_3(CH_2)_{10}$—, and $CH_3(CH_2)_{16}$—.

In a particularly preferred embodiment of the presently claimed invention, $T^1$ is $CH_3(CH_2)_{10}$—.

In another particularly preferred embodiment of the presently claimed invention, $T^1$ is H.

In a preferred embodiment of the presently claimed invention, $A^1$ and $A^2$ are each independently selected from —$(CH_2)_5$—, —$(CH_2)_4$—, —$(CH_2)_3$— and

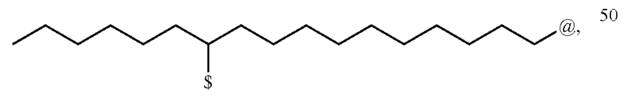

wherein $ indicates the point of attachment to oxygen atom of the polyester and @ indicates the point of attachment to carbonyl group of the polyester.

In a more preferred embodiment of the presently claimed invention, $A^1$ and $A^2$ are each independently selected from —$(CH_2)_5$— and —$(CH_2)_4$—.

In a more preferred embodiment of the presently claimed invention, m is an integer from 0 to 75;

n is an integer from 0 to 75; and m+n is an integer from 2 to 150.

In a most preferred embodiment of the presently claimed invention, m is an integer from 0 to 50;

n is an integer from 0 to 50; and m+n is an integer from 2 to 50.

In a more preferred embodiment of the presently claimed invention, $A^1$ and $A^2$ are the same.

In a particularly preferred embodiment of the presently claimed invention, $A^1$ and $A^2$ are —$(CH_2)_5$—.

In another particularly preferred embodiment of the presently claimed invention, $A^1$ and $A^2$ are —$(CH_2)_4$—.

In another particularly preferred embodiment of the presently claimed invention, $A^1$ and $A^2$ are

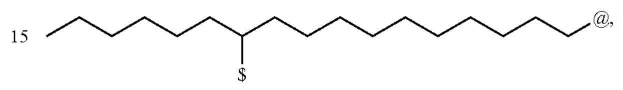

wherein $ indicates the point of attachment to oxygen atom of the polyester and @ indicates the point of attachment to carbonyl group of the polyester.

In a preferred embodiment of the presently claimed invention, $A^1$ and $A^2$ are different from each other; and the ratio of m and n is in the range from 10:1 to 1:10.

In a more preferred embodiment of the presently claimed invention, the ratio of m and n is in the range from 5:1 to 1:5.

In a most preferred embodiment of the presently claimed invention, the ratio of m and n is in the range from 2:1 to 1:2.

In an even more preferred embodiment of the presently claimed invention, $A^1$ is —$(CH_2)_5$— and $A^2$ is —$(CH_2)_4$—, and the ratio of m and n is in the range from 10:1 to 1:10.

In a most preferred embodiment of the presently claimed invention, $A^1$ is —$(CH_2)_5$— and $A^2$ is —$(CH_2)_4$—, and the ratio of m and n is in the range from 5:1 to 1:5.

In a particularly preferred embodiment of the presently claimed invention, $A^1$ is —$(CH_2)_5$— and $A^2$ is —$(CH_2)_4$—, and the ratio of m and n is 2:1.

In a preferred embodiment of the presently claimed invention the at least one aliphatic polyether moiety P.3 is selected from (P.3a) and (P.3b), (P.3a)

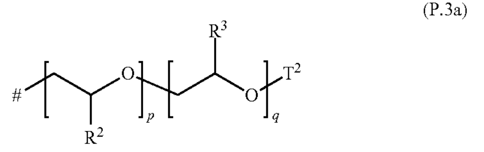

(P.3b)

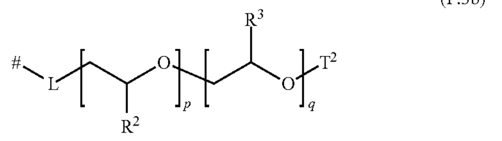

wherein,

#indicates the point of attachment to a nitrogen atom of the polyalkyleneimine backbone;

L is a linker;

$R^2$ and $R^3$ are each independently selected from the group consisting of hydrogen and $C_1$-$C_2$-alkyl;

p is an integer from 0 to 200;

q is an integer from 0 to 200;

p+q is an integer from 2 to 200; and $T^2$ is hydrogen, $C_1$-$C_{20}$-alkyl, $C_2$-$C_{20}$-alkenyl, C(═O)—$C_2$-$C_{20}$-alkenyl or C(═O)—$C_1$-$C_{20}$-alkyl, wherein $C_2$-$C_{20}$-alkenyl has 1, 2, 3 or 4 olefinic C═C-double bonds, and wherein 1, 2, 3, or 4 non-adjacent $CH_2$ groups of $C_1$-$C_{20}$-alkyl may be replaced by O.

In a more preferred embodiment of the presently claimed invention, p is an integer from 0 to 100;

q is an integer from 0 to 100; and p+q is an integer from 2 to 100.

In a more preferred embodiment of the presently claimed invention, $R^2$ is H, p is an integer from 2 to 100;

q is o; and $T^2$ is H or $CH_3$.

In a more preferred embodiment of the presently claimed invention, $R^2$ is $CH_3$, p is an integer from 2 to 100;

q is o; and $T^2$ is H or $CH_3$.

In a more preferred embodiment of the presently claimed invention $R^2$ is H, p is an integer from 1 to 100;

$R^3$ is —$CH_3$, q is an integer 1 to 100;

p+q is an integer from 2 to 150 and $T^2$ is H or $CH_3$.

In a preferred embodiment of the presently claimed invention the linker L is at least one selected from the group consisting of (L.1), (L.2), (L.3) and (L.4),

L.1

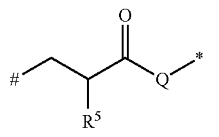

L.2

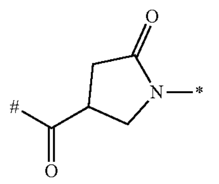

L.3

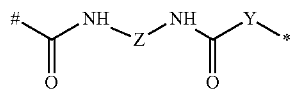

L.4

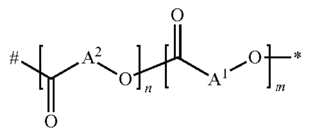

wherein

#indicates the point of attachment to a nitrogen atom of the polyalkyleneimine backbone;

indicates the point of attachment to the polyether moiety P.3;

$R^5$ is H or $CH_3$;

Q is a direct bond or a divalent moiety selected from —O—, —N(H)—, and —S—;

Y is O or NH;

Z is selected from the group consisting of $C_1$-$C_{24}$ alkyl, $C_4$-$C_{10}$ cycloalkyl, $C_6$-$C_{18}$ aryl, and $C_7$-$C_{20}$ arylalkyl;

$A^1$ and $A^2$ are each independently selected from $C_2$-$C_{12}$ alkylene;

m is an integer from 0 to 100;

n is an integer from 0 to 100; and m+n is an integer from 2 to 100.

In a preferred embodiment of the presently claimed invention $R^5$ is H.

In a more preferred embodiment of the presently claimed invention $R^5$ is H and Q is O.

In a most preferred embodiment of the presently claimed invention L.1 is

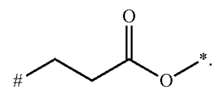

In a more preferred embodiment of the presently claimed invention L.2 is

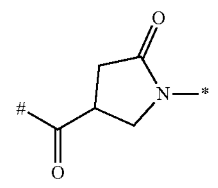

In a more preferred embodiment of the presently claimed invention Z is $C_7$ aralkyl.

In a most preferred embodiment of the presently claimed invention Z is 2,4-toluoyl.

In a particularly preferred embodiment of the presently claimed invention L.3 is

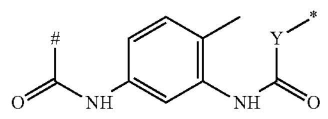

wherein

#indicates the point of attachment to a nitrogen atom of the polyalkyleneimine backbone;

* indicates the point of attachment to the polyether moiety P.3;

Y is O or NH.

In a more preferred embodiment of the presently claimed invention $A^1$ and $A^2$ are each independently selected from —$(CH_2)_5$—, —$(CH_2)_4$—, —$(CH_2)_3$— and

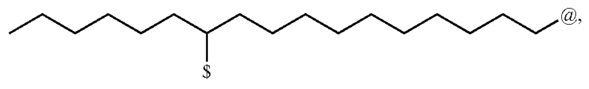

wherein $ indicates the point of attachment to oxygen atom of the polyester and @ indicates the point of attachment to carbonyl group of the polyester;

m is an integer from 0 to 100;

n is an integer from 0 to 100; and m+n is an integer from 2 to 100.

In a more preferred embodiment of the presently claimed invention, $A^1$ and $A^2$ are the same.

In a most preferred embodiment of the presently claimed invention, $A^1$ and $A^2$ are —$(CH_2)_5$—.

In another most preferred embodiment of the presently claimed invention, $A^1$ and $A^2$ are $—(CH_2)_4—$.

In another particularly preferred embodiment of the presently claimed invention, $A^1$ and $A^2$

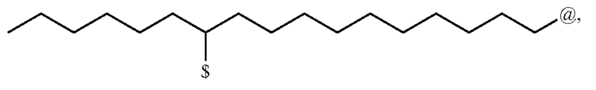

are wherein $ indicates the point of attachment to oxygen atom of the polyester and @ indicates the point of attachment to carbonyl group of the polyester.

In a more preferred embodiment of the presently claimed invention, $A^1$ and $A^2$ are different from each other and each is independently selected from $—(CH_2)_5—$, $—(CH_2)_4—$ and $—(CH_2)_3—$.

In a more preferred embodiment of the presently claimed invention, m is an integer from 0 to 75;

n is an integer from 0 to 75; and m+n is an integer from 2 to 150.

In a most preferred embodiment of the presently claimed invention, m is an integer from 0 to 50;

n is an integer from 0 to 50; and m+n is an integer from 2 to 50.

In a preferred embodiment of the presently claimed invention, the polymer comprises a) from 0.5 to 25 weight % of the polyalkyleneimine backbone, based on the total weight of the polymer;

b) from 0.5 to 25 weight % of the at least one aromatic moiety P.1, based on the total weight of the polymer;

c) from 1 to 50 weight % of the at least one polyester P.2, based on the total weight of the polymer; and d) from 30 to 90 weight % by of the at least one aliphatic polyether moiety P.3, based on the total weight of the polymer.

In a more preferred embodiment of the presently claimed invention, the polymer comprises a) from 1 to 20 weight % of the polyalkyleneimine backbone, based on the total weight of the polymer;

b) from 1 to 20 weight % of the at least one aromatic moiety P.1, based on the total weight of the polymer;

c) from 2 to 30 weight % of the at least one polyester P.2, based on the total weight of the polymer; and d) from 30 to 80 weight % by of the at least one aliphatic polyether moiety P.3, based on the total weight of the polymer.

In a most preferred embodiment of the presently claimed invention, the polymer comprises a) from 2 to 15 weight % of the polyalkyleneimine backbone, based on the total weight of the polymer;

b) from 2 to 15 weight % of the at least one aromatic moiety P.1, based on the total weight of the polymer;

c) from 5 to 25 weight % of the at least one polyester P.2, based on the total weight of the polymer; and d) from 40 to 70 weight % by of the at least one aliphatic polyether moiety P.3, based on the total weight of the polymer.

In a preferred embodiment of the presently claimed invention, the polymer has an amine number in the range of 10 to 1000 mg KOH/g, as determined according to DIN 53176:2002-11.

In a preferred embodiment of the presently claimed invention, the polymer has an acid number in the range of 0 to 15 mg KOH/g, more preferably in the range of 0 to 12 mg KOH/g, even more preferably in the range of 0 to 10 mg KOH/g, as determined according to DIN 53402:1990-09.

In another aspect, the presently claimed invention provides a process for preparing the polymer; the process comprises the following steps.

i. A polyalkyleneimine is reacted with an aromatic carboxylic acid, an aromatic carboxylic anhydride or with an amide or imide forming derivative of an aromatic carboxylic acid, in such an amount that theoretically at most 90%, based on the total amount of primary and secondary nitrogen atoms of the polyalkyleneimine can be consumed.

ii. The product of step (i) is reacted with a hydroxycarboxylic acid, a lactone monomer or a polyester moiety having a terminal carboxyl group obtainable from the lactone monomer.

iii. The product of step (ii) is reacted with an alkylene oxide or a polyether moiety having a terminal radical selected from an acrylate, an isocyanato, and a carboxylate.

In yet another aspect, the presently claimed invention provides a process for preparing the polymer; the process comprises the following steps.

i. A polyalkyleneimine is reacted with an aromatic carboxylic acid, an aromatic carboxylic anhydride or with an amide or imide forming derivative of an aromatic carboxylic acid, in such an amount that theoretically at most 90%, based on the total amount of primary and secondary nitrogen atoms of the polyalkyleneimine can be consumed.

ii. The product of step (i) is reacted with a hydroxycarboxylic acid, a lactone monomer or a polyester moiety having a terminal carboxyl group obtainable from the lactone monomer; and an alkylene oxide or a polyether moiety having a terminal radical selected from an acrylate, an isocyanato, and a carboxylate.

In yet another aspect, the presently claimed invention provides a process for preparing the polymer; the process comprises reacting a polyalkyleneimine with an aromatic carboxylic acid, an aromatic carboxylic anhydride or with an amide or imide forming derivative of an aromatic carboxylic acid;

a hydroxycarboxylic acid, a lactone monomer or a polyester moiety having a terminal carboxyl group obtainable from the lactone monomer; and an alkylene oxide or a polyether moiety having a terminal radical selected from an acrylate, an isocyanato, and a carboxylate.

In yet another aspect, the presently claimed invention provides a process for preparing the polymer; the process comprises the following steps.

i. A polyalkyleneimine is reacted with an aromatic carboxylic acid, an aromatic carboxylic anhydride or with an amide or imide forming derivative of an aromatic carboxylic acid; and a hydroxycarboxylic acid, a lactone monomer or a polyester moiety having a terminal carboxyl group obtainable from the lactone monomer.

ii. The product of step (i) is reacted with an alkylene oxide or a polyether moiety having a terminal radical selected from an acrylate, an isocyanato, and a carboxylate.

In a preferred embodiment of the presently claimed invention, the aromatic carboxylic acid is

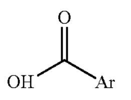

wherein Ar is selected from the group consisting of phenyl and naphthyl, wherein phenyl and naphthyl, each independently, are unsubstituted or substituted by 1, 2, 3, 4 or 5 radicals, which are selected from the group consisting of halogen, OH, $C_1$-$C_4$-alkyl, $C_1$-$C_4$-alkoxy, C(═O)—OH, C(═O)—$NH_2$, $NH_2$, $NO_2$, NH—C(═O)—H, NH—$C_1$-$C_4$-alkyl and NH—C(═O)—$C_1$-$C_4$-alkyl.

In a preferred embodiment of the presently claimed invention the aromatic carboxylic anhydride is

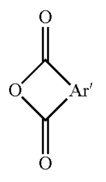

wherein Ar' is selected from the group consisting of 1,2-phenylene, 1,2-, 2,3-, or 1,8-naphthylene, wherein phenylene and naphthylene, each independently, are unsubstituted or substituted by 1, 2, 3, 4 or 5 radicals, which are selected from the group consisting of halogen, OH, $C_1$-$C_4$-alkyl, $C_1$-$C_4$-alkoxy, C(═O)—OH, C(═O)—$NH_2$, $NH_2$, $NO_2$, NH—C(═O)—H, NH—$C_1$-$C_4$-alkyl, and NH—C(═O)—$C_1$-$C_4$-alkyl.

In a preferred embodiment of the presently claimed invention the aromatic carboxylic anhydride is selected from the group consisting of moieties of formulae (P.1d') and (P.1e'), (P.1d')

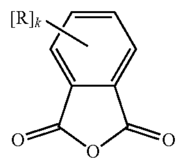

(P.1e')

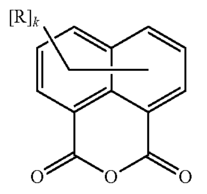

wherein, R and k are defined as above.

In a preferred embodiment of the presently claimed invention the amide or imide forming derivative of an aromatic carboxylic acid is selected from compounds of formula (I), (I)

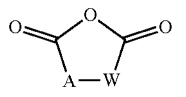

wherein

W is a chemical bond or a divalent moiety selected from the group consisting of —O—, —NH— and —S—; and A is an unsubstituted or substituted aromatic group selected from the group consisting of the formula

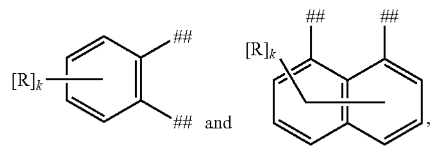

wherein

#, k and R are defined as above.

In a preferred embodiment of the presently claimed invention, the compound of formula (I) has W═NH and A is

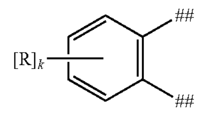

wherein ##is defined as above and k=0. The compound of formula (I) is isatoic anhydride.

In a preferred embodiment of the presently claimed invention, the hydroxycarboxylic acid is 12-hydroxystearic acid.

In a preferred embodiment of the presently claimed invention the lactone monomer is at least one selected from the group consisting of ε-caprolactone, γ-valerolactone, γ-butyrolactone, wherein the lactone monomer is unsubstituted or substituted by 1, 2 or 3 substituents selected from the group consisting of methyl, hydroxy and methoxy.

In a preferred embodiment of the presently claimed invention polyester moiety having a terminal carboxyl group is

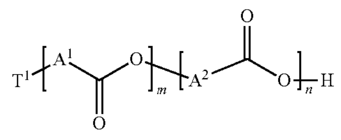

wherein $T^1$, $A^1$, $A^2$, m and n are defined as above.

In a preferred embodiment of the presently claimed invention the alkylene oxide is at least one selected from the group consisting of ethylene oxide and propylene oxide.

In a preferred embodiment of the presently claimed invention the polyether moiety having a terminal radical selected from an acrylate, an isocyanato and a carboxylate is selected from

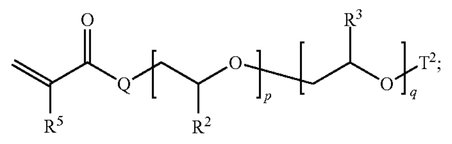

-continued

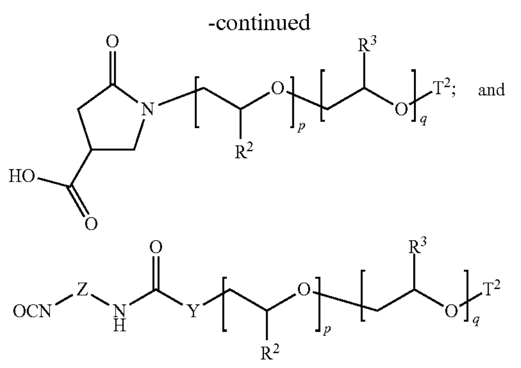

and wherein $R^5$, Q, $R^2$, $R^3$, $T^2$, Y and Z are defined as above.

The dispersants of the presently claimed invention can be used in broad application fields, such as coatings, inks and electronic materials. These dispersants can be used in solvent-based systems such as organic and inorganic pigments dispersion, e.g. in alkyd, CAB (cellulose acetate butyrate), UV (Ultraviolet) and TPA (thermoplastic acrylate) paint systems, industrial coatings. These dispersants can also be used water-based systems such as printing inks and graphic arts.

In yet another aspect, the presently claimed invention provides a liquid composition in the form of a dispersion comprising a particulate solid material selected from the group consisting of pigments and fillers, and a liquid diluent, wherein the particulate solid material is dispersed in the liquid diluent. The liquid diluent further comprises the polymer of the presently claimed invention.

In a preferred embodiment of the presently claimed invention, the weight ratio of particulate solid material to the polymer is in the range from 100:1 to 1:2; more preferably in the range from 100:1 to 1:1; even more preferably from 100:1 to 10:1; and most preferably from 100:1 to 50:1.

In another preferred embodiment of the presently claimed invention, the weight ratio of particulate solid material to the polymer is in the range from 50:1 to 1:2; more preferably in the range from 10:1 to 2:1; and most preferably from 5:1 to 2:1.

In a preferred embodiment of the presently claimed invention, the size of the solid particulate material represented as the weight average particle diameter is in the range from 1 nm to 20000 nm; more preferably form 10 nm to 10000 nm; and most preferably from 20 nm to 500 nm. The weight average particle diameter may be determined by sieving analysis or by light scattering methods.

The pigments can be inorganic or organic.

In a preferred embodiment of the presently claimed invention, the organic pigments are pigments and pearlescent flakes selected from the group consisting of azo, disazo, naphthol, benzimidazolone, azocondensation, metal complex, isoindolinone, and isoindoline pigments, the chinophthalon pigment, dioxazine pigment and the polycyclic pigment selected from the group consisting of indigo, thioindigo, quinacridones, phthalocyanines, perylenes, perionones, anthraquinones, such as aminoanthraquinones or hydroxyanthraquinones, anthrapyrimidines, indanthrones, flavanthrones, pyranthrones, anthantrones, isoviolanthrones, diketopyrrolopyrrole, and carbazoles, e.g. carbazole violet, and the like. Further examples of organic pigments can be found in the monograph: W. Herbst, K. Hunger "*Industrielle Organische Pigmente*"2nd Edition, 1995, VCH Verlagsgesellschaft, ISBN: 3-527-28744-2.

In a preferred embodiment of the presently claimed invention, the inorganic pigments are selected from the group consisting of metallic flakes, such as aluminum, Aluminium oxide, calcium carbonate, silicon oxide and silicates, iron(III)oxide, chromium(III)oxide, titanium(IV) oxide, zirconium(IV)oxide, zinc oxide, zinc sulphide, zinc phosphate, mixed metal oxide phosphates, molybdenum sulphide, cadmium sulphide, carbon black or graphite, vanadates, such as bismuth vanadate, chromates, such as lead (IV)chromate, and molybdates, such as lead(IV)molybdate, and mixtures, crystal forms or modifications thereof, such as rutile, anatase, mica, talcum, kaolin, and mixtures thereof.

In a preferred embodiment of the presently claimed invention, the pigment is carbon black and the weight average particle diameter of the pigment is in the range from 100 nm to 300 nm.

In a preferred embodiment of the presently claimed invention, the fillers are selected from the group consisting of calcium carbonate, silicates, glass fibers, glass beads, talc, kaolin, mica, barium sulphate, metal oxides and hydroxides, carbon black, graphite, wood powders, powders and fibers of other natural products, synthetic fibers and mixtures thereof.

The liquid diluent present in the dispersion will depend on the field of application.

For water-based formulations, the liquid diluent comprises water. The liquid diluent may further comprise polar, water-miscible solvents such as $C_1$-$C_4$ alkanols, e.g. methanol, ethanol, isopropanol, propanol or n-butanol, glycol ethers like butyl glycol, or methoxypropylene glycol, polyols, e.g. glycerol, ethyleneglycol, diethyleneglycol, triethylene, triethylene glycol, propylene glycol or butyl diglycol; or mixtures thereof.

For solvent-based formulations, the liquid diluent is selected from low polarity solvents such as aliphatic hydrocarbons, esters like butyl acetate, or glycol ethers like methoxypropylene glycol and glycol ether esters like methoxypropylene glycol acetate and mixtures thereof.

In a preferred embodiment of the presently claimed invention, the weight ratio of the fine particulate solid materials to the liquid diluent is in the range from 100:1 to 1:50; and more preferably in the range from 30:1 to 1:10.

The dispersion further comprises a binder and/or one or more additives depending on the intended use. The additives include but are not limited to plasticizers, lubricants, emulsifiers, humectants, rheology additives, catalysts, flow auxiliaries, optical brighteners, flame retardants, preservatives, antistatic agents and blowing agents.

In a preferred embodiment of the presently claimed invention, the dispersion is in the form of a mill base. The millbase comprises the fine particulate solid materials, the dispersant of formula (I), the liquid diluent and optionally additives, but generally millbase will not contain binders.

In a preferred embodiment of the presently claimed invention, the dispersion is in the form of a coating composition. The coating composition comprises the fine particulate solid materials, the dispersant of formula (I), the liquid diluent and additionally at least one binder, e.g. film-forming polymers or prepolymers which form a film upon curing. The coating composition further comprise additives conventionally used in coating technology, e.g. plasticizers, lubricants, emulsifiers, rheology additives, catalysts, flow auxiliaries, optical brighteners, flame retardants, preservatives, antistatic agents or blowing agents.

In a preferred embodiment of the presently claimed invention, the dispersion is in the form of an ink composition, e.g. a printing ink or a gravure ink. The ink composition comprises the fine particulate solid materials, the dispersant of formula (I), the liquid diluent and additionally at least one binder conventionally used in ink technology, e.g. film-forming polymers or prepolymers which form a film upon curing.

The presently claimed invention offers one or more of the following advantages:

1) The dispersants of the presently claimed invention provide stable dispersions with a high pigment loading.
2) The dispersions containing the dispersants of the presently claimed invention have a low viscosity. The viscosity of the dispersions is significantly reduced even at a high pigment loading.
3) The dispersants of the presently claimed invention enhance the rheology behavior of dispersions. Further, their rheology behavior does not change with time.
4) Surfaces coated with coating compositions comprising the dispersants of the presently claimed invention display a high gloss and a reduced crater number.

In the following, there is provided a list of embodiments to further illustrate the present disclosure without intending to limit the disclosure to the specific embodiments listed below.

1. A polymer having
   a) a polyalkyleneimine backbone;
   b) at least one aromatic moiety P.1, which is bound to a nitrogen atom of the polyalkyleneimine backbone via a carboxamide or carboximide group;
   c) at least one polyester moiety P.2, which is bound to a nitrogen atom of the polyalkyleneimine backbone via a carboxamide; and
   d) at least one aliphatic polyether moiety P.3, which is bound to a nitrogen atom of the polyalkyleneimine backbone via a direct bond or via a linker.
2. The polymer according to embodiment 1, wherein the polyalkyleneimine backbone has a weight average molecular weight in the range of from 100 g/mol to 20,000 g/mol, as determined according to DIN 55672-1.
3. The polymer according to embodiment 1 or 2, wherein the polyalkyleneimine backbone is a polyethyleneimine backbone.
4. The polymer according to any of embodiments 1 to 3, wherein the at least one aromatic moiety P.1 is selected from the moieties of the formulae (P.1') and (P.1"), (P.1')

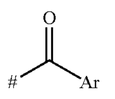

(P.1")

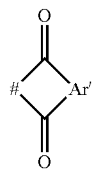

wherein

#indicates the point of attachment of the aromatic moiety P.1 to a nitrogen atom of the polyalkyleneimine backbone;

Ar is selected from the group consisting of phenyl and naphthyl, wherein phenyl and naphthyl, each independently, are unsubstituted or substituted by 1, 2, 3, 4 or 5 radicals, which are selected from the group consisting of halogen, OH, $C_1$-$C_4$-alkyl, $C_1$-$C_4$-alkoxy, C(═O)—OH, C(═O)—$NH_2$, $NH_2$, $NO_2$, NH—C(═O)—H, NH—$C_1$-$C_4$-alkyl and NHC(═O)—$C_1$-$C_4$-alkyl; and Ar' is selected from the group consisting of 1,2-phenylene, 1,2-, 2,3-, or 1,8-naphthylene, wherein phenylene and naphthylene, each independently, are unsubstituted or substituted by 1, 2, 3, 4 or 5 radicals, which are selected from the group consisting of halogen, OH, $C_1$-$C_4$-alkyl, $C_1$-$C_4$-alkoxy, C(═O)—OH, C(═O)—$NH_2$, $NH_2$, $NO_2$, NHC(═O)—H, NH—$C_1$-$C_4$-alkyl, and NH—C(═O)—$C_1$-$C_4$-alkyl.

5. The polymer according to any of embodiments 1 to 4, wherein the at least one aromatic moiety P.1 is selected from the group consisting of moieties of formulae (P.1a), (P.1b), (P.1c), (P.1d), and (P.1e), (P.1a)

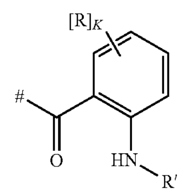

(P.1b)

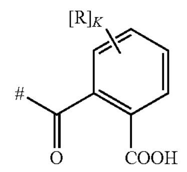

(P.1c)

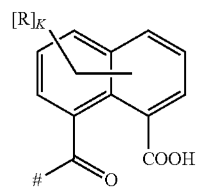

(P.1d)

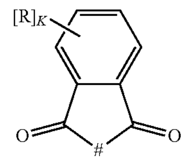

(P.1e)

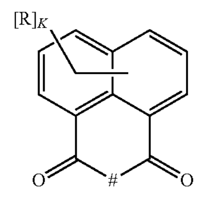

wherein

#indicates the point of attachment of the aromatic moiety to a nitrogen atom of the polyalkyleneimine backbone;

R' is selected from the group consisting of hydrogen, $C_1$-$C_4$-alkyl, —C(═O)—H and —C(═O)—$C_1$-$C_4$-alkyl;

k is 0, 1, 2, 3 or 4; and

R is, identical or different, a radical selected from the group consisting of halogen, OH, $C_1$-$C_4$-alkyl, $C_1$-$C_4$-alkoxy, C(═O)—OH, C(═O)—$NH_2$, $NH_2$, $NO_2$, NH—C(═O)—H, NH—$C_1$-$C_4$-alkyl, and NH—C(═O)—$C_1$-$C_4$-alkyl.

6. The polymer according to any of embodiments 1 to 5, wherein the polyester moiety P.2 is a radical of the formula (P.2a)

(P.2a)

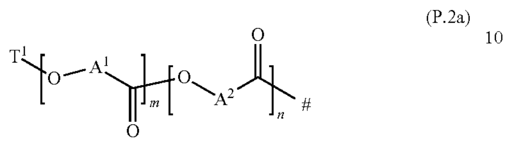

wherein,

#indicates the point of attachment to a nitrogen atom of the polyalkyleneimine backbone;

$T^1$ is hydrogen or $R^1$—C(═O)— wherein $R^1$ is $C_1$-$C_{24}$ alkyl;

$A^1$ and $A^2$ are each independently selected from $C_2$-$C_{12}$ alkylene;

m is an integer from 0 to 100;

n is an integer from 0 to 100; and m+n is an integer from 2 to 100.

7. The polymer according to embodiment 6, wherein $T^1$ is selected from the group consisting of hydrogen, $CH_3(CH_2)_3$—, $CH_3(CH_2)_{10}$—, and $CH_3(CH_2)_{16}$—.

8. The polymer according to embodiment 6, wherein $A^1$ and $A^2$ are each independently selected from —$(CH_2)_5$—, —$(CH_2)_4$—, —$(CH_2)_3$—, and

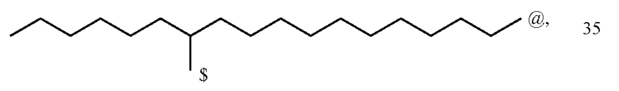

wherein $ indicates the point of attachment to oxygen atom of the polyester and @ indicates the point of attachment to carbonyl group of the polyester.

9. The polymer according to embodiment 6, wherein m is an integer from 0 to 50; n is an integer from 0 to 50; and m+n is an integer from 2 to 50.

10. The polymer according to embodiment 6, wherein the "m" repeating units and the "n" repeating units form a gradient, a random or a block polymer structure.

11. The polymer according to any of embodiments 1 to 10, wherein the at least one aliphatic polyether moiety P.3 is selected from (P.3a) and (P.3b), (P.3a)

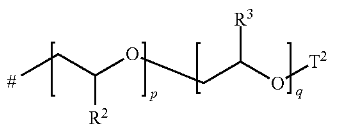

(P.3b)

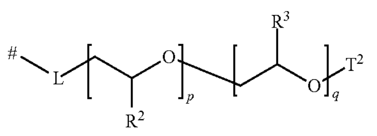

wherein,

#indicates the point of attachment to a nitrogen atom of the polyalkyleneimine backbone;

L is a linker;

$R^2$ and $R^3$ are each independently selected from the group consisting of hydrogen and $C_1$-$C_2$-alkyl;

p is an integer from 0 to 200;

q is an integer from 0 to 200;

p+q is an integer from 2 to 200; and $T^2$ is hydrogen, $C_1$-$C_{20}$-alkyl, $C_2$-$C_{20}$-alkenyl, C(═O)—$C_2$-$C_{20}$-alkenyl or C(═O)$C_1$-$C_{20}$-alkyl, wherein $C_2$-$C_{20}$-alkenyl has 1, 2, 3 or 4 olefinic C═C-double bonds, and wherein 1, 2, 3, or 4 non-adjacent $CH_2$ groups of $C_1$-$C_{20}$-alkyl may be replaced by O.

12. The polymer according to embodiment 11, wherein p is an integer from 0 to 100; q is an integer from 0 to 100; and p+q is an integer from 2 to 100.

13. The polymer according to embodiment 11, wherein $R^2$ is H, p is an integer from 2 to 100; q is 0; and $T^2$ is H.

14. The polymer according to embodiment 11, wherein $R^2$ is H, p is an integer from 1 to 100; $R^3$ is —$CH_3$, q is an integer 1 to 100; p+q is an integer from 2 to 150 and $T^2$ is H or CH3.

15. The polymer according to embodiment 11, wherein the linker L is at least one selected from the group consisting of (L.1), (L.2), (L.3) and (L.4),

L.1

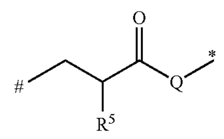

L.2

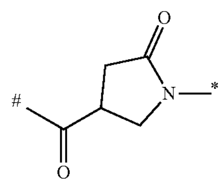

L.3

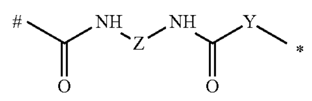

L.4

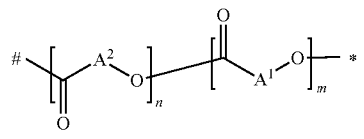

wherein

#indicates the point of attachment to a nitrogen atom of the polyalkyleneimine backbone;

* indicates the point of attachment to the polyether moiety P.3;

$R^5$ is H or $CH_3$;

Q is a direct bond or a divalent moiety selected from —O—, —N(H)—, and —S—;

Y is O or NH;

Z is selected from the group consisting of $C_1$-$C_{24}$ alkyl, $C_4$-$C_{10}$ cycloalkyl, $C_6$-$C_{18}$ aryl, and $C_7$-$C_{20}$ arylalkyl;

$A^1$ and $A^2$ are each independently selected from $C_2$-$C_{12}$ alkylene;

m is an integer from 0 to 100;

n is an integer from 0 to 100; and m+n is an integer from 2 to 100.

16. The polymer according to embodiment 15, wherein $R^5$ is H.

17. The polymer according to embodiment 15, wherein L.3 is

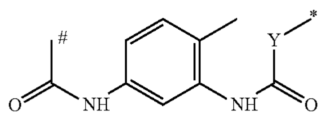

wherein

#indicates the point of attachment to a nitrogen atom of the polyalkyleneimine backbone;

* indicates the point of attachment to the polyether moiety P.3;

Y is O or NH.

18. The polymer according to any of embodiments 1 to 17 comprising a) from 0.5 to 25 weight % of the polyalkyleneimine backbone, based on the total weight of the polymer;

b) from 0.5 to 25 weight % of the at least one aromatic moiety P.1, based on the total weight of the polymer;

c) from 1 to 50 weight % of the at least one polyester P.2, based on the total weight of the polymer; and d) from 30 to 90 weight % by of the at least one aliphatic polyether moiety P.3, based on the total weight of the polymer.

19. The polymer according to any of embodiments 1 to 18, wherein the polymer has an acid number in the range of 0 to 15 mg KOH/g, as determined according to DIN 53402:1990-09.

20. A process for preparing the polymer according to any of embodiments 1 to 19, comprising the following steps, i. reacting a polyalkyleneimine with an aromatic carboxylic acid, an aromatic carboxylic anhydride or with an amide or imide forming derivative of an aromatic carboxylic acid, in such an amount that theoretically at most 90%, based on the total amount of primary and secondary nitrogen atoms of the polyalkyleneimine can be consumed;

ii. reacting the product of step (i) with a hydroxycarboxylic acid, a lactone monomer or a polyester moiety having a terminal carboxyl group obtainable from the lactone monomer; and iii. reacting the product of step (ii) with an alkylene oxide or a polyether moiety having a terminal radical selected from an acrylate, an isocyanato, and a carboxylate.

21. A process for preparing the polymer according to any of embodiments 1 to 19, comprising the following steps, i. reacting a polyalkyleneimine with an aromatic carboxylic acid, an aromatic carboxylic anhydride or with an amide or imide forming derivative of an aromatic carboxylic acid, in such an amount that theoretically at most 90%, based on the total amount of primary and secondary nitrogen atoms of the polyalkyleneimine can be consumed; and ii. reacting the product of step (i) with a hydroxycarboxylic acid, a lactone monomer or a polyester moiety having a terminal carboxyl group obtainable from the lactone monomer; and an alkylene oxide or a polyether moiety having a terminal radical selected from an acrylate, an isocyanato, and a carboxylate.

22. A process for preparing the polymer according to any of embodiments 1 to 19, comprising reacting a polyalkyleneimine with an aromatic carboxylic acid, an aromatic carboxylic anhydride or with an amide or imide forming derivative of an aromatic carboxylic acid;

a hydroxycarboxylic acid, a lactone monomer or a polyester moiety having a terminal carboxyl group obtainable from the lactone monomer; and an alkylene oxide or a polyether moiety having a terminal radical selected from an acrylate, an isocyanato, and a carboxylate.

23. A process for preparing the polymer according to any of embodiments 1 to 19, comprising the following steps, i. reacting a polyalkyleneimine with an aromatic carboxylic acid, an aromatic carboxylic anhydride or with an amide or imide forming derivative of an aromatic carboxylic acid; and a hydroxycarboxylic acid, a lactone monomer or a polyester moiety having a terminal carboxyl group obtainable from the lactone monomer; and ii. reacting the product of step (i) with an alkylene oxide or a polyether moiety having a terminal radical selected from an acrylate, an isocyanato, and a carboxylate.

24. The process according to any of embodiments 20 to 23, wherein the aromatic carboxylic acid is

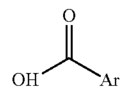

wherein Ar is defined as in any of embodiments 1 to 19.

25. The process according to any of embodiments 20 to 24, wherein the aromatic carboxylic anhydride is

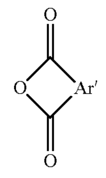

wherein Ar' is defined as in any of embodiments 1 to 19.

26. The process according to any of embodiments 20 to 25, wherein the amide or imide forming derivative of an aromatic carboxylic acid is selected from compounds of formula (I), (I)

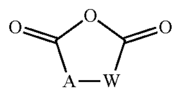

wherein

W is a chemical bond or a divalent moiety selected from the group consisting of —O—, —NH— and —S—; and A is an unsubstituted or substituted aromatic group selected from the group consisting of the formula

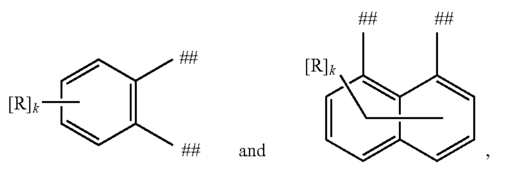

and , wherein

, k and R are defined as in any of embodiments 1 to 19.

27. The process according to any of embodiments 20 to 26, wherein the lactone monomer is at least one selected from the group consisting of ε-caprolactone, γ-valerolactone, γ-butyrolactone, wherein the lactone monomer is unsubstituted or substituted by 1, 2 or 3 substituents selected from the group consisting of methyl, hydroxy and methoxy.

28. The process according to any of embodiments 20 to 27, wherein polyester moiety having a terminal carboxyl group is

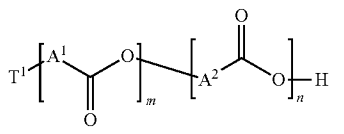

wherein T', $A^1$, $A^2$, m and n are defined as in any of embodiments 1 to 19.

29. The process according to any of embodiments 20 to 28, wherein hydroxycarboxylic acid is 12-hydroxystearic acid.

30. The process according to any of embodiments 20 to 29, wherein the alkylene oxide is at least one selected from the group consisting of ethylene oxide and propylene oxide.

31. The process according to any of embodiments 20 to 30, wherein the polyether moiety having a terminal radical selected from an acrylate, an isocyanato and a carboxylate is selected from

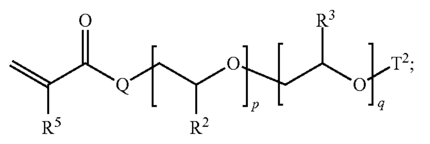

-continued

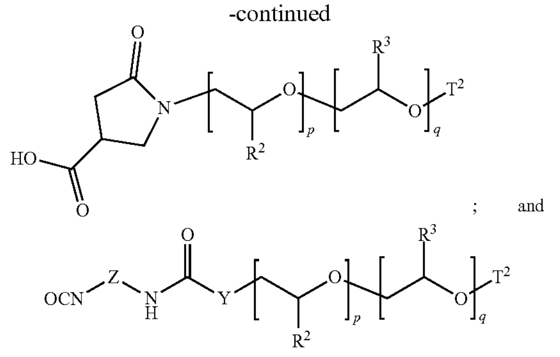

; and wherein $R^5$, Q, $R^2$, $R^3$, $T^2$, Y and Z are defined as in any of embodiments 1 to 19.

32. A liquid composition in the form of a dispersion comprising a particulate solid material selected from the group consisting of pigments and fillers, a liquid diluent, wherein the particulate solid material is dispersed in the liquid diluent, further comprising a polymer according to any of embodiments 1 to 19.

33. The liquid composition according to embodiment 32, wherein the weight ratio of particulate solid material to the polymer is in the range from 100:1 to 1:2.

34. The liquid composition according to embodiment 32 or 33, which is in the form of a millbase, a coating composition or an ink.

35. Use of the polymer according to any of embodiments 1 to 19 as a component of a coating composition or an ink composition.

While the presently claimed invention has been described in terms of its specific embodiments, certain modifications and equivalents will be apparent to those skilled in the art and are intended to be included within the scope of the presently claimed invention.

EXAMPLES

The presently claimed invention is illustrated in detail by non-restrictive working examples which follow. More particularly, the test methods specified hereinafter are part of the general disclosure of the application and are not restricted to the specific working examples.

Materials

Lupasol® PR 8515—Polyethyleneimine with an average molecular weight of 2000 g/mol as determined according to DIN 55672-1;

Lupasol® FG—Polyethyleneimine with an average molecular weight 800 g/mol as determined according to DIN 55672-1;

Desmodur® T 100SP—Pure 2,4'-toluene diisocyanate (TDI) is available from Covestro AG.

Epomin® SP-200—Polyethyleneimine with an average molecular weight of 10,000 g/mol is available from Nippon Shokubai Co. Ltd. Japan.

Carbon Black FW171—a high color, high structured, after-treated amorphous carbon black is available from Orion Engineered Carbons GmbH.

Hypomer® FS-2050—a hydroxyl acrylic resin solvent is available from Elementis GmbH.

Jeffamine® M-600—Polyetheramine having an average molecular weight of 600 g/mol is available from Huntsman Corporation, Belgium.

Methods

Acid number: The acid number was determined according to DIN 53402:1990-09.

Amine number: The amine number was determined according to DIN 53176:2002-11.

Isocyanate (NCO) content: The isocyanate (NCO) content was determined according to DIN 14896:2009-07.

Viscosity: The viscosity was determined by analogy to DIN 53019-1:2008-09, using a Thermo-Haake RheoStress 600 equipment under the CR mode at 22° C. and a shear rate of 1 $sec^{-1}$ (Spindle CP50).

A) Preparation of the Dispersants i) Preparation of Intermediates

Intermediate A1: Copolymer of Lauric Acid, Caprolactone and Valerolactone

A mixture of lauric acid (10 g, 0.05 mol), ε-caprolactone (60 g, 0.5 mol), γ-valerolactone (20 g, 0.25 mol) and titanium (IV) butylate (0.5 g) as a catalyst was stirred at 170° C. until the solid content of the mixture was greater than 97%. The mixture was cooled to obtain intermediate A1 as a yellowish liquid having an acid number of 32 mg KOH/g.

Intermediate B1: Copolymer of MPEG 500 and Acrylic Anhydride

A mixture of 50 g polyethylene glycol) methyl ether (MW of 500 g/mol) and 12 g acrylic anhydride was stirred at room temperature for 1 h. The temperature of the reaction mixture was slowly increased to 80° C. followed by stirring at 80° C. for 2 h. The acrylic acid formed during the reaction was removed from the reaction mixture under vacuum to obtain intermediate B1. The acrylic functionality content of intermediate B1 was determined by $^1$H-NMR, and it was found to be 0.95.

Intermediate B2: Copolymer of Jeffamine M2070 and Itaconic Acid

A 500 mL four-necked flask equipped with a stirrer, a thermometer and maintained under nitrogen atmosphere, was charged with 150 g Jeffamine® PEMA 2070 (MW of 2000 g/mol) and 9.76 g itaconic acid, and the reaction mixture was stirred at room temperature for 1 h. The temperature of the reaction mixture was increased to 80° C. and the pressure was slowly reduced to 100 mbar, followed by stirring under these conditions for 5 h. The reaction temperature was increased to 120° C. while maintaining the pressure at 100 mbar, followed by stirring for 5 h. Intermediate B2 was obtained as an orange clear liquid having an acid number of 26 mg KOH/g.

Intermediate B3: Copolymer of Jeffamine M-600 and TDI100

In a reactor maintained at room temperature, were added 30 g ethyl acetate and 14.4 g Desmodur® T 100SP. 50 g Jeffamine® M-600 (MW of 600 g/mol) was slowly added to the above mixture over 2 h. The reaction mixture was slowly heated to 40° C. followed by heating at 40° C. for 1 h to obtain intermediate B3 having an isocyanate content of 3.6%.

The intermediate should be freshly prepared before each usage.

Intermediate C1: Copolymer of PEI 2000 and 1,8-Naphthalic Anhydride

A mixture of 50 g Lupasol® PR 8515 (polyethyleneimine, MW of 2000 g/mol) and 50 g 1,8-naphthalic anhydride was stirred at 150° C. under nitrogen atmosphere until the acid number of the mixture was less than 5 mg KOH/g to obtain intermediate C1.

Intermediate C2: Copolymer of PEI 800 and Isatoic Anhydride

A mixture of 50 g Lupasol® FG (polyethyleneimine, MW of 800 g/mol) and 30 g isatoic anhydride was stirred at room temperature for 1 h. The temperature of the reaction mixture was slowly increased to 60° C. and followed by heating at 60° C. until there was no further carbon dioxide release. Intermediate C2 having an amine number of 860 mg KOH/g was obtained.

ii) Preparation of Dispersants from the Intermediates Prepared in Step (i)

Example 1: Preparation of Dispersant 1 (Grafting onto Based on Two Steps)

A mixture of 40 g intermediate A1, 40 g intermediate B1 and 10 g intermediate C1 was heated at 40° C. for 3 h under nitrogen atmosphere. The mixture was slowly heated to 170° C. under nitrogen atmosphere followed by addition of 0.1 g dibutyl tin dilaurate (DBTL) catalyst and the resulting mixture was heated at 170° C. until the acid number of the mixture was less than 10 mg KOH/g. Dispersant 1 was obtained as a brown viscous liquid with an acid number of 6 mg KOH/g.

Examples 2-8: Preparation of Dispersants 2 to 8 (Grafting onto Based on Two Steps)

Dispersants 2 to 8 were prepared according to a process similar to the process for preparation of Dispersant 1. The intermediates and amounts thereof used for the preparation of Dispersants 2 to 8 are provided in Table 1.

TABLE 1

Preparation of Dispersants 2 to 8

| | Intermediate 1 | Intermediate 2 | Intermediate 3 | Acid number Mg KOH/g |
|---|---|---|---|---|
| Dispersant 2 | A1 20 g | B1 40 g | C1 20 g | 3 |
| Dispersant 3 | A1 40 g | B1 60 g | C2 10 g | 3 |
| Dispersant 4 | A1 30 g | B2 40 g | C1 10 g | 6 |
| Dispersant 5 | A1 30 g | B2 50 g | C1 10 g | 7 |
| Dispersant 6 | A1 30 g | B2 30 g | C1 10 g | 5 |
| Dispersant 7 | A1 40 g | B2 60 g | C1 20 g | 5 |
| Dispersant 8 | A1 40 g | B3 40 g | C1 20 g | 3 |

Example 9: Preparation of Dispersant 9 (Grafting onto Based on One Pot Step)

A mixture of 5 g Lupasol® PR8515 (polyethyleneimine, BASF, $M_w$ of 2000 g/mol), 5 g 1,8-naphthalic anhydride, 30 g ε-caprolactone and 50 g intermediate B1 was heated at 40° C. for 3 h under nitrogen atmosphere. The mixture was slowly heated to 100° C. and followed by addition of 0.1 g DBTL catalyst and the resultant mixture was heated to 170° C. until the solid content was greater than 95%. The resultant mixture was heated under vacuum till acid number was less than 10 mg KOH/g. Dispersant 9 was obtained as a brown viscous dispersant with an acid number of 5 mg KOH/g.

Examples 10-15: Preparation of Dispersants 10 to 15 (Grafting onto Based on One Pot Steps)

The dispersants 10 to 15 were prepared according to a process similar to the process for preparation of Dispersant 9. The reactants used for their preparation are listed below in Table 2.

TABLE 2

Preparation of Dispersants 10 to 15

| | Polyamine | anhydride | polyester monomer | Interme-diate | Acid number mg KOH/g |
|---|---|---|---|---|---|
| Dispersant 10 | Lupasol ® FG 5 g | 1,8-naph-thalic anhydride 3 g | ε-Caprolac-tone 30 g | B1 40 g | 3 |
| Dispersant 11 | Lupasol ® FG 5 g | 1,8-naph-thalic anhydride 5 g | ε-Caprolac-tone 30 g | B2 50 g | 5 |
| Dispersant 12 | Lupasol ® FG 5 g | Isatoic anhydride 5 g | γ-Valerolac-tone 40 g | B2 40 g | 4 |
| Dispersant 13 | Lupasol ® PR8515 5 g | 1,8-naph-thalic anhydride 5 g | 12-hydroxyl stearic acid 30 g | B2 60 g | 7 |
| Dispersant 14 | Lupasol ® PR8515 5 g | Isatoic anhydride 3 g | ε-Caprolac-tone 30 g | B3 30 g | 1 |
| Dispersant 15 | Lupasol ® PR8515 5 g | 1,8-naph-thalic anhydride 3 g | ε-Caprolac-tone 20 g | B3 30 g | 1 |

Example 16: Preparation of Dispersant 16 (Ethoxylation to Form the PEO)

In a reactor, 5 g Lupasol® FG (polyethyleneimine, MW of 800 g/mol), 5 g isatoic anhydride, 20 g ε-caprolactone and 0.1 g DBTL catalyst were charged and the mixture was heated at 170° C. until the solid content of the mixture was greater than 97%. The resultant mixture was cooled to 120° C., and 0.2 g potassium tert-butoxide (KOtBu) was added to the mixture. The reactor was charged with 10 g ethylene oxide over 15 minutes. The ethylene oxide pressure in the reactor was 2 bar. An additional 60 g ethylene oxide was charged to the reactor over next 12 h. Thereafter, the reaction mixture was cooled to 80° C. and all volatile by-products and residual monomers were removed under vacuum. Dispersant 16 was obtained as a brown viscous dispersant with an acid number of 0 mg KOH/g.

Example 17: Preparation of Dispersant 17 (Propoxylation to Form the PPO)

In a reactor, 5 g Lupasol® FG (polyethyleneimine, MW of 800 g/mol), 5 g isatoic anhydride, 20 g ε-caprolactone and 0.1 g DBTL catalyst were charged and the mixture was heated at 170° C. until the solid content of the mixture was greater than 97%. The resultant material was cooled to 140° C., and 0.2 g potassium tert-butoxide (KOtBu) was charged. The reactor was charged with 50 g propylene oxide over 15 minutes. The propylene oxide pressure in the reactor was 2 bar. An additional 50 g propylene oxide was charged to the reactor over next 12 h. Thereafter, the reaction mixture was cooled to 80° C. and all volatile by-products and residual monomers were removed under vacuum. Dispersant 17 was obtained as a brown viscous dispersant with an acid number of 0 mg KOH/g.

Example 18: Preparation of Dispersant 18 (Ethoxylation to Form the PEO)

In a reactor, 5 g Lupasol® PR8515 (polyethyleneimine, MW of 2000 g/mol), 5 g 1,8-naphthalic anhydride, 30 g ε-caprolactone and 0.1 g DBTL catalyst were charged and the mixture was heated at 170° C. until the solid content of the mixture was greater than 97%. The resultant mixture was cooled to 120° C., and 0.2 g KOtBu was added. The reactor was charged with 5 g ethylene oxide over 15 minutes. The ethylene oxide pressure in the reactor was 2 bar. An additional 35 g ethylene oxide was charged to the reactor over next 12 h. Thereafter, the reaction mixture was cooled down to 80° C. and all volatile by-products and residual monomers were removed under vacuum. Dispersant 18 was obtained as a brown viscous liquid with an acid number of 0 mg KOH/g.

Example 19: Preparation of Dispersant 19 (Ethoxylation to Form the PEO)

In a reactor, 5 g Lupasol® PR8515 (polyethyleneimine, MW of 2000 g/mol), 5 g 1,8-naphthalic anhydride, 30 g ε-caprolactone and 0.1 g DBTL catalyst were charged and the mixture was heated at 170° C. until the solid content of the mixture was greater than 97%. The resultant mixture was cooled to 100° C., and 0.2 g KOtBu was added. The reactor was charged with 5 g ethylene oxide over 15 minutes. The ethylene oxide pressure in the reactor was 2 bar. An additional 55 g ethylene oxide was charged to the reactor over next 12 h. Thereafter, the reaction mixture was cooled to 80° C. and all volatile by-products and residual monomers were removed under vacuum. Dispersant 19 was obtained as a brown viscous liquid with an acid number of 0 mg KOH/g.

Example 20: Preparation of Dispersant 20 (Alkoxylation to Form the PPO/PEO)

In a reactor, 5 g Lupasol® FG (polyethyleneimine, MW of 800 g/mol), 5 g 1,8-naphthalic anhydride, 20 g ε-caprolactone and 0.1 g DBTL catalyst were charged and the mixture was heated at 170° C. until the solid content of the mixture was greater than 97%. The resultant mixture was cooled to 140° C., and 0.2 g KOtBu was added. The reactor was charged with 20 g propylene oxide over 6 h. The propylene oxide pressure in the reactor was 2 bar. An additional 50 g ethylene oxide was charged to the reactor over next 12 h. Thereafter, the reaction mixture was cooled down to 80° C. and all volatile by-products and residual monomers were removed under vacuum. Dispersant 20 was obtained as a brown viscous liquid with an acid number of 0 mg KOH/g.

Preparation of Dispersant for Comparative Studies (Comparative Dispersants 1 and 2)

Comparative Dispersant 1: Copolymer of Epomin® SP-200 and Caprolactone

It was prepared according to the procedure described in Example 20 of U.S. Pat. No. 8,268,957B2.

A mixture of 6.66 g Epomin® SP-200 (polyethyleneimine, MW 10,000), 100.0 g ε-caprolactone, and 0.5 g dibutyltin dilaurate were stirred under nitrogen and heated to 180° C. until the solid contents of the mixture reached 98% to obtain comparative dispersant 1.

Comparative Dispersant 2: Copolymer of Polyethyleneimine, 1,8-Naphthalic Anhydride, Caprolactone, Valerolactone and 12-Hydroxystearic Acid It was prepared according to Example 4 of WO 2017/140538A1.

A mixture of 8 g polyethyleneimine, 1.8 g 1,8-naphthalic anhydride, 60 g ε-caprolactone, 20 g γ-valerolactone and 10 g 12-hydroxystearic acid was stirred at 100° C. until a homogenous mixture was obtained. The mixture was heated and stirred at 180° C. under nitrogen atmosphere for 12 h. Comparative dispersant 2 was obtained as a viscous liquid with an amine number of 33 mg KOH/g and acid number of 9 mg KOH/g.

B) Performance Testing i) Preparation of a Paint Composition for Testing

In order to test the dispersion effect of the obtained samples, a resin free pigment concentrate (millbase) was prepared followed by the preparation of a paint composition.

Step 1: Preparation of a Millbase or Pigment Concentrate

A resin free millbase (water-based pigment concentrate) having the composition according to Formulation 1 was prepared.

| Formulation 1: Preparation of millbase | | |
|---|---|---|
| Sr. | Component | Amount |
| 1 | Dispersant (100% solid) | 9.5 g |
| 2 | 1-Methoxy-2-propylacetate | 50 g |
| 3 | Carbon Black FW171 | 10.5 g |
| 4 | 2.0 mm glass beads | 70 g |
| | Total | 140 g |

The milling step was carried out in a Scandex Shaker for 4 h with the help of glass beads to obtain a dispersion or millbase. The dispersion was filtered and stored at room temperature overnight.

The rheological behaviour of the millbase was evaluated with a Thermo-Haake RheoStress 600 equipment under the CR mode. The viscosity of the millbase was determined and the results are summarized in Table 2.

TABLE 2

| Millbase viscosity (Viscosity @ 1 $S^{-1}$) | |
|---|---|
| Example | MPa · s |
| Comparative dispersant 1 | 57500 |
| Comparative dispersant 2 | 250 |
| Dispersant 2 | 60 |
| Dispersant 5 | 100 |
| Dispersant 8 | 150 |
| Dispersant 10 | 30 |
| Dispersant 11 | 40 |
| Dispersant 15 | 60 |
| Dispersant 16 | 150 |
| Dispersant 19 | 200 |

It is evident from Table 2 that the millbase prepared using the dispersants of the presently claimed invention have a low millbase viscosity. On the contrary, the millbase prepared using the comparative dispersant has a high viscosity.

Thus, the dispersants of the presently claimed invention provides a low viscosity millbase and coating composition for the same amount of pigment loading.

Step 2: Preparation of a Paint Composition

A paint composition was prepared by dispersing 1.0 g of millbase (formulation 1) obtained in step 1 into 9.0 g Hypomer® FS-2050 resin using Dispermat® for 2 minutes at 2000 rpm.

ii) Application Example

The paint composition obtained in step 2 was applied on polyester film with a 75 μm film thickness and dried at 130° C. in oven for 30 min. The surface coating was evaluated, and the results are summarized in Table 3.

TABLE 3

| Crater ranking | |
|---|---|
| Example | Crater ranking* |
| Comparative dispersant 1 | 5 |
| Comparative dispersant 2 | 4 |
| Dispersant 2 | 2 |
| Dispersant 5 | 1 |
| Dispersant 8 | 1 |
| Dispersant 10 | 1 |
| Dispersant 11 | 1 |
| Dispersant 15 | 1 |
| Dispersant 16 | 2 |
| Dispersant 19 | 2 |

*1 means no crater and 5 means many craters

It is observed from Table 3 that the performance of the paint compositions prepared using the dispersants of the presently claimed invention was significantly better with satisfactory results such as a low crater ranking as compared to the paint compositions prepared using dispersant from comparative examples 1 and 2.

The invention claimed is:

1. A polymer having a) from 0.5 to 25 weight % of a polyalkyleneimine backbone based on the total weight of the polymer;

b) from 0.5 to 25 weight % of at least one aromatic moiety P.1, which is bound to a nitrogen atom of the polyalkyleneimine backbone via a carboxamide or carboximide group, based on the total weight of the polymer;

c) from 1 to 50 weight % of at least one polyester moiety P.2, which is bound to a nitrogen atom of the polyalkyleneimine backbone via a carboxamide, based on the total weight of the polymer; and d) from 30 to 90 weight % of at least one aliphatic polyether moiety P.3, which is bound to a nitrogen atom of the polyalkyleneimine backbone via a direct bond or via a linker, based on the total weight of the polymer, wherein the at least one aromatic moiety P.1 is selected from the moieties of the formulae (P.1') and (P.1"), (P.1')

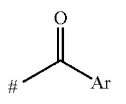

(P.1")

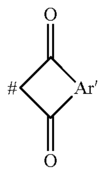

wherein

#indicates the point of attachment of the aromatic moiety P.1 to a nitrogen atom of the polyalkyleneimine backbone;

Ar is selected from the group consisting of phenyl and naphthyl, wherein phenyl and naphthyl, each independently, are unsubstituted or substituted by 1, 2, 3, 4 or 5 radicals, which are selected from the group consisting of halogen, OH, $C_1$-$C_4$-alkyl, $C_1$-$C_4$-alkoxy, C(═O)—OH, C(═O)—$NH_2$, $NH_2$, $NO_2$, NH—C(═O)—H, NH—$C_1$-$C_4$-alkyl and NH—C(═O)—$C_1$-$C_4$-alkyl; and Ar' is selected from the group consisting of 1,2-phenylene, 1,2-, 2,3-, or 1,8-naphthylene, wherein phenylene and naphthylene, each independently, are unsubstituted or substituted by 1, 2, 3, 4 or 5 radicals, which are selected from the group consisting of halogen, OH, $C_1$-$C_4$-alkyl, $C_1$-$C_4$-alkoxy, C(═O)—OH, C(═O)—$NH_2$, $NH_2$, $NO_2$, NH—C(═O)H, NH—$C_1$-$C_4$-alkyl, and NH—C(═O)—$C_1$-$C_4$-alkyl, wherein the polyester moiety P.2 is a radical of the formula (P.2a)

(P.2a)

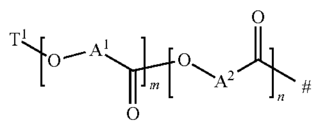

wherein,

#indicates the point of attachment to a nitrogen atom of the polyalkyleneimine backbone;

$T^1$ is hydrogen or $R^1$—C(═O)— wherein $R^1$ is $C_1$-$C_{24}$ alkyl;

$A^1$ and $A^2$ are each independently selected from $C_2$-$C_{12}$ alkylene;

m is an integer from 0 to 100;

n is an integer from 0 to 100; and m+n is an integer from 2 to 100.

2. The polymer according to claim 1, wherein the polyalkyleneimine backbone has a weight average molecular weight in the range of from 100 g/mol to 20,000 g/mol, as determined according to DIN 55672-1.

3. The polymer according to claim 1, wherein the polyalkyleneimine backbone is a polyethyleneimine backbone.

4. The polymer according to claim 1, wherein the at least one aromatic moiety P.1 is selected from the group consisting of moieties of formulae (P.1a), (P.1b), (P.1c), (P.1d), and (P.1e), (P.1a)

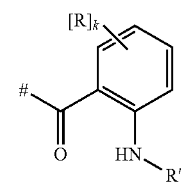

(P.1b)

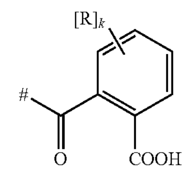

(P.1c)

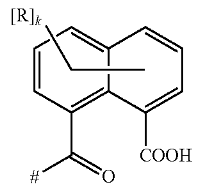

(P.1d)

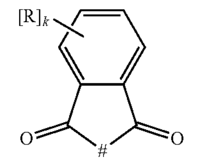

(P.1e)

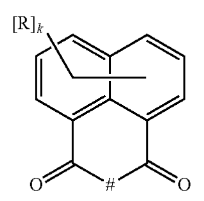

wherein

#indicates the point of attachment of the aromatic moiety to a nitrogen atom of the polyalkyleneimine backbone;

R' is selected from the group consisting of hydrogen, $C_1$-$C_4$-alkyl, —C(═O)—H and —C(═O)—$C_1$-$C_4$-alkyl;

k is 0, 1, 2, 3 or 4; and

R is, identical or different, a radical selected from the group consisting of halogen, OH, $C_1$-$C_4$-alkyl, $C_1$-$C_4$- alkoxy, C(═O)—OH, C(═O)—$NH_2$, $NH_2$, $NO_2$, NH—C(═O)—H, NH—$C_1$-$C_4$-alkyl, and NH—C(═O)—$C_1$-$C_4$-alkyl.

5. The polymer according to claim 1, wherein the at least one aliphatic polyether moiety P.3 is selected from (P.3a) and (P.3b), (P.3a)

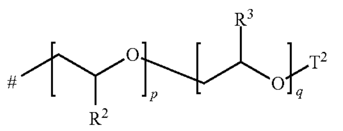

(P.3b)

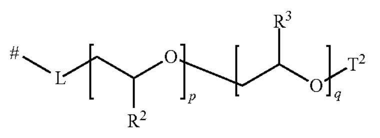

wherein,

#indicates the point of attachment to a nitrogen atom of the polyalkyleneimine backbone;

L is a linker;

$R^2$ and $R^3$ are each independently selected from the group consisting of hydrogen and $C_1$-$C_2$-alkyl;

p is an integer from 0 to 200;

q is an integer from 0 to 200;

p+q is an integer from 2 to 200; and $T^2$ is hydrogen, $C_1$-$C_{20}$-alkyl, $C_2$-$C_{20}$-alkenyl, C(═O)—$C_2$-$C_{20}$-alkenyl or C(═O)—$C_1$-$C_{20}$-alkyl, wherein $C_2$-$C_{20}$-alkenyl has 1, 2, 3 or 4 olefinic C═C-double bonds, and wherein 1, 2, 3, or 4 non-adjacent $CH_2$ groups of $C_1$-$C_{20}$-alkyl may be replaced by O.

6. The polymer according to claim 5, wherein the linker L is at least one selected from the group consisting of (L.1), (L.2), (L.3) and (L.4),

L.1

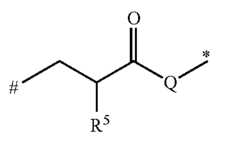

L.2

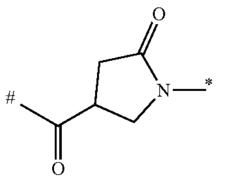

L.3

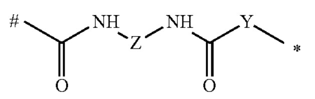

L.4

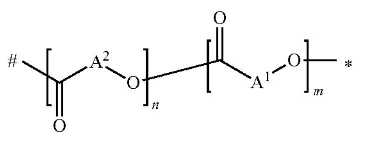

wherein

#indicates the point of attachment to a nitrogen atom of the polyalkyleneimine backbone;

* indicates the point of attachment to the polyether moiety P.3;

$R^5$ is H or $CH_3$;

Q is a direct bond or a divalent moiety selected from —O—, —N(H)—, and —S—;

Y is O or NH;

Z is selected from the group consisting of $C_1$-$C_{24}$ alkyl, $C_4$-$C_{10}$ cycloalkyl, $C_6$-$C_{18}$ aryl, and $C_7$-$C_{20}$ arylalkyl;

$A^1$ and $A^2$ are each independently selected from $C_2$-$C_{12}$ alkylene;

m is an integer from 0 to 100;

n is an integer from 0 to 100; and m+n is an integer from 2 to 100.

7. The polymer according to claim 1, wherein the polymer has an acid number in the range of 0 to 15 mg KOH/g, as determined according to DIN 53402:1990-09.

8. A process for preparing the polymer according to claim 1, comprising the following steps, i. reacting a polyalkyleneimine with an aromatic carboxylic acid, an aromatic carboxylic anhydride or with an amide or imide forming derivative of an aromatic carboxylic acid, in such an amount that theoretically at most 90%, based on the total amount of primary and secondary nitrogen atoms of the polyalkyleneimine can be consumed;

ii. reacting the product of step (i) with a hydroxycarboxylic acid, a lactone monomer or a polyester moiety having a terminal carboxyl group obtainable from the lactone monomer; and iii. reacting the product of step (ii) with an alkylene oxide or a polyether moiety having a terminal radical selected from an acrylate, an isocyanato, and a carboxylate.

9. A process for preparing the polymer according to claim 1, comprising the following steps, i. reacting a polyalkyleneimine with an aromatic carboxylic acid, an aromatic carboxylic anhydride or with an amide or imide forming derivative of an aromatic carboxylic acid, in such an amount that theoretically at most 90%, based on the total amount of primary and secondary nitrogen atoms of the polyalkyleneimine can be consumed; and ii. reacting the product of step (i) with a hydroxycarboxylic acid, a lactone monomer or a polyester moiety having a terminal carboxyl group obtainable from the lactone monomer; and an alkylene oxide or a polyether moiety having a terminal radical selected from an acrylate, an isocyanato, and a carboxylate.

10. A process for preparing the polymer according to claim 1, comprising reacting a polyalkyleneimine with an aromatic carboxylic acid, an aromatic carboxylic anhydride or with an amide or imide forming derivative of an aromatic carboxylic acid;

a hydroxycarboxylic acid, a lactone monomer or a polyester moiety having a terminal carboxyl group obtainable from the lactone monomer; and an alkylene oxide or a polyether moiety having a terminal radical selected from an acrylate, an isocyanato, and a carboxylate.

11. A process for preparing the polymer according to claim 1, comprising the following steps, i. reacting a polyalkyleneimine with an aromatic carboxylic acid, an aromatic carboxylic anhydride or with an amide or imide forming derivative of an aromatic carboxylic acid; and a hydroxycarboxylic acid, a lactone monomer or a polyester moiety having a terminal carboxyl group obtainable from the lactone monomer; and ii. reacting the product of step (i) with an alkylene oxide or a polyether moiety having a terminal radical selected from an acrylate, an isocyanato, and a carboxylate.

12. A liquid composition in the form of a dispersion comprising a particulate solid material selected from the group consisting of pigments and fillers, a liquid diluent, wherein the particulate solid material is dispersed in the liquid diluent, further comprising a polymer according to claim 1.

13. The polymer according to claim 1, wherein $T^1$ is $CH_3(CH_2)_{10}$—.

14. The polymer according to claim 13, wherein Ar is naphthyl and Ar' is 1,2-, 2,3-, or 1,8-naphthylene.

* * * * *